United States Patent
Okumura et al.

[15] 3,660,235
[45] May 2, 1972

[54] METHOD FOR PRODUCING PHENYLALANINE BY FERMENTATION

[72] Inventors: Shinji Okumura, Tokyo; Shinichiro Otsuka, Yokohama; Akio Yamanoi, Tokyo; Fumihiro Yoshinaga, Kawasaki; Takeshi Honda, Yokohama; Koji Kubota, Tokyo; Takayasu Tsuchida, Kawasaki, all of Japan

[73] Assignee: Ajinomoto Co., Inc., Tokyo, Japan

[22] Filed: Aug. 14, 1970

[21] Appl. No.: 63,953

[30] Foreign Application Priority Data

Aug. 22, 1969  Japan....................................44/66374
Oct. 29, 1969  Japan....................................44/86601

[52] U.S. Cl. .............................195/29, 195/28 R, 195/37, 195/47

[51] Int. Cl. .....................................................C12d 13/06
[58] Field of Search .................................195/37, 47, 28, 29

[56] References Cited

UNITED STATES PATENTS 3,562,110   2/1971   Dours et al...........................195/28 R Primary Examiner—Alvin E. Tanenholtz
Attorney—Kelman and Berman

[57] ABSTRACT

Mutants of microorganisms of the genere Brevibacterium, Corynebacterium, Arthrobacter, Bacillus, and Candida which tolerate amounts of phenylalanine analogues sufficient to inhibit growth of the parent strains produce extracellular L-phenylalanine in conventional culture media in amounts sufficient to warrant recovery.

11 Claims, No Drawings

METHOD FOR PRODUCING PHENYLALANINE BY FERMENTATION

This invention relates to the production of L-phenyl-alanine by fermentation.

L-Phenylalanine, hereinafter referred to as phenylalanine, improves the flavor of foods, and has been used as a food supplement, and in medical research. Heretofore phenylalanine has been prepared on a commercial scale by extraction of protein hydroylzate at relatively high cost in a complex procedure.

An auxotrophic mutant of *Micrococcus glutamicus* requiring tyrosine has been known to accumulate phenylalanine in a culture medium.

It has now been found that certain mutants tolerant to analogues of phenylalanine, which are derived by conventional mutagenic methods from microorganisms belonging to the genera Brevibacterium, Corynebacterium, Arthrobacter, Bacillus or Candida, are capable of producing extracellular phenylalanine during aerobic fermentation of conventional nutrient media.

The methods of mutation are conventional such as spontaneous mutation of parent strains in the presence of the analogues of phenylalanine in a medium, exposure of cells of the parent strains to ultra-violet light, X-rays, or gamma rays in mutagenic doses, or to sodium nitrite, nitrosoguanidine, or diethyl sulfate solution, which are known as chemical mutagenic agents. For example, the cells of a parent strain on an agar nutrient medium are exposed to ultra-violet light (2,375A) form a source which is placed 30 cm away, for 3 minutes.

The mutants tolerant to the analogues of phenylalanine are selected from the exposed parent strains by conventional methods. The exposed parent strains are allowed to grow on an agar medium or in an aqueous nutrient medium containing an amount of one of the analogues of phenylalanine, which completely inhibit the growth of the parent strain, but not containing phenylalanine. Then, the mutants tolerant to the analogues of phenylalanine are screened. The amounts of the analogues of phenylalanine added to the screening media are varied according to the kind of parent strains and analogues of phenylalanine employed. Generally more than 1,000 γ/ml of the analogues of phenylalanine are added.

The analogues of phenylalanine in this invention have the following general features, and are generally known as antagonists:

1. They are compounds analogous to phenylalanine.
2. They inhibit the microbial metabolism of phenylalanine and microbial growth.
3. The inhibition is more or less overcome by the presence of phenylalanine in the medium.

Presently known analogues of phenylalanine having the features mentioned above are β-amino-β-phenylpropionic acid, o-fluorophenylalanine, m-fluorophenylalanine, p-fluorophenylalanine, β-2-thienylalanine, β-3-thienylalanine, β-2-furylalanine, β-3-furylalanine, o-aminophenylalanine, m-phenylalanine, p-aminophenylalanine, α-amino-β-phenylethane sulfonate, β-2-pyrrolalanine, 1-cyclopentene-1-alanine, 1-cyclohexene-1-alanine, β-4-pyridinylalanine, β-4-pyrazolealanine, p-nitrophenylalanine, β-4-thiazolealanine, cyclohexylalanine, 2-amino-4-methyl-4-hexenoic acid, S-(1,2-dichlorovinyl)-cysteine, o-chlorophenylalanine, m-chlorophenylalanine, p-chlorophenylalanine, o-bromophenylalanine, m-bromophenylalanine, and p-bromophenylalanine.

The parent strains of the mutants are of the genera Brevibacterium, Corynebacterium, Arthrobacter, Bacillus or Candida, and are unable to produce phenylalanine.

The mutants which tolerate the analogues of phenylalanine can grow on an agar medium or in an aqueous medium containing the analogues of phenylalanine in an amount which inhibits the growth of the parent strains.

The mutants tolerant to one of the analogues of phenylalanine are usually tolerant to many analogues of phenylalanine.

The most effective phenylalanine-producing mutants found so far (and the phenylalanine analogues employed in screening them) are *Brevibacterium flavum* FERM-P 422 (m-fluorophenylalanine), *Brevibacterium lactofermentum* FERM-P 423 (m-fluorophenylalanine), *Brevibacterium lactofermentum* ATCC 21420 (β-amino-β-phenylpropionic acid), *Corynebacterium acetoacidophilum* ATCC 21421 (p-fluorophenylalanine), *Arthrobacter citreus* ATCC 21422 (p-fluorophenylalanine), *Bacillus subtilis* FERM-P 464 (m-fluorophenylalanine), and *Candida lipolitica* FERM-P 424 (m-fluorophenylalanine).

Specimen cultures of microorganisms identified by ATCC and FERM-P numbers are freely available to qualified persons without our permission from the American Type Culture Collection in 12301 Parklawn Drive, Rockville, Maryland, 20852, U.S.A., and from the Fermentation Research Institute, Agency of Industrial Science & Technology in 1-8-5, Inage Higashi, Chiba-shi, Chiba, Japan, respectively.

The parent strains of the specimen cultures mentioned above are *Brevibacterium flavum* ATCC No. 14067, *Brevibacterium lactofermentum* ATCC No. 13869, *Corynebacterium acetoacidophilum* ATCC No. 13870, *Arthrobacter citreus* ATCC No. 17775, *Bacillus subtilis* ATCC No. 13952, *Candida lipolytica* ATCC No. 16617, and they are also freely available from ATCC without our permission.

The nutrient media fermented by means of the microorganisms of this invention are conventional in themselves and contain assimilable sources of carbon and nitrogen, and inorganic salts. Minor amounts of organic nutrient such as vitamins and amino acids may be added. Assimilable carbon sources include glucose, fructose, galactose, mannose, mannitol, sucrose, glycerine, starch, starch hydrolyzate and molasses; alcohols such as methylalcohol, ethylalcohol, propylalchol and butylalcohol; organic acids such as acetic acid, lactic acid, butyric acid, propionic acid and fumaric acid; hydrocarbons such as n-paraffins having carbon chains of eight to 20 members; and aromatic compounds such as phenol, benzylalcohol and benzoic acid. Assimilable nitrogen sources include organic or inorganic nitrogen-containing compounds such as nitrates, ammonium salts, gaseous ammonia, ammonium hydrox de solution and urea.

For a good yield of phenylalanine, the fermentation is carried out aerobically with aeration and/or agitation. Best yield requires pH control within the range of 5 to 9. The desired pH may be maintained by adding gaseous or aqueous ammonia, calcium carbonate, alkali metal hydroxide, urea, organic or inorganic acids to the medium from time to time, some of which may also supply assimilable nitrogen. When the fermentation is carried out at 24° C to 37° C, the concentration of phenylalanine in the broth reaches its maximum within 2 to 7 days.

The phenylalanine accumulated in the fermentation broth can be recovered by conventional methods, such as removing cells by filtration or centrifugation, passing the broth over an ion exchanged resin and precipitation at the isoelectric point of phenylalanine. The phenylalanine present in the broth is determined by bio-assay employing *Leuconostoc citrovorum*.

The following examples further illustrate the invention:

EXAMPLE 1

An aqueous culture medium was prepared to contain glucose 10 g, monobasic potassium phosphate 0.15 g, ammonium sulfate 3 g, magnesium sulfate 0.8 g, biotin 10γ, thiamine hydrochloride 10γ, "Aji-eki" (protein hydrolyzate, trademark) 1.5 ml, ferric ion and manganese ion 0.2 mg, per deciliter respectively, and adjusted to pH 6.0. 20 ml batches of the medium were placed in 500 ml flasks, sterilized by steam, mixed with 1 gram of separately sterilized calcium carbonate, and inoculated with *Arthrobacter citreus* ATCC 21422. The fermentation was carried out at 30° C for 72 hours with shaking. After the cultivation, 2.0 g/l phenylalanine was found in the fermentation broth. 5 liters of the combined broth was filtered to remove cells, and passed over an ion-exchange resin.

The resin was eluted with ammonium hydroxide solution, and the eluate was partly evaporated in a vacuum. Thereafter, 5.1 grams of phenylalanine crystals were obtained by pouring ethylalcohol into the eluate.

EXAMPLE 2

*Brevibacterium lactofermentum* ATCC 21420 was inoculated into the same medium and cultured under the same conditions as in Example 1. After 72 hours cultivation, 2.3 g/l of phenylalanine was found in the fermentation broth.

EXAMPLE 3

In the same method as in Example 1 except for 2 ml of Ajieki, per deciliter of culture medium *Corynebacterium acetoacidophilum* ATCC 21421 was employed. After 72 hours cultivation, 1.5 g/l phenylalanine was found in the broth.

EXAMPLE 4

An aqueous culture medium was prepared to contain per deciliter, glucose 10 g, monobasic potassium phosphate 0.1 g, magnesium sulfate 0.04 g, ammonium sulfate 4 g, ferric ion 0.2 mg, manganese ion 0.2 mg, biotin 20 $\mu$ g, thiamine hydrochloride 20 $\mu$g and calcium carbonate 2 g. 20 ml batches of the medium were placed into 500 ml flasks, and sterilized by steam. Thereafter, *Brevibacterium flavum* FERM-P No. 422, *Bacillus subtilis* FERM-P No. 464, *Candida lipolytica* FERM-P No. 424 or *Brevibacterium lactofermentum* FERM-P No. 423 were inoculated into respective batches of the culture medium. The fermentations were carried out at 31.5° C for 70 hours with shaking. After the cultivation, 1,880 mg/l, 280 mg/l, 35 mg/l and 1,390 mg/l of phenylalanine were found in the fermentation broths respectively.

What we claim is:

1. A method of producing L-phenylalanine which comprises:
    a. culturing a L-phenylalanine producing mutant of a parent strain of Brevibacterium, Corynebacterium, Arthrobacter, Bacillus, or Candida under aerobic conditions in a nutrient medium containing assimilable sources of carbon and nitrogen and inorganic salts until L-phenylalanine accumulates in the medium,
        1. said mutant being capable of growth in the presence of an amount of an analogue of said L-phenylalanine sufficient to inhibit growth of said parent strain, and capable of producing L-phenylalanine when cultured in said medium,
    b. recovering accumulated L-phenylalanine from said medium.

2. A method as set forth in claim 1, wherein said mutant is *Brevibacterium flavum* FERM-P 422.

3. A method as set forth in claim 1, wherein said mutant is *Brevibacterium lactofermentum* FERM-P 423.

4. A method as set forth in claim 1, wherein said mutant is *Brevibacterium lactofermentum* ATCC 21420.

5. A method as set forth in claim 1, wherein said mutant is *Corynebacterium acetoacidophilum* ATCC 21421.

6. A method as set forth in claim 1, wherein said mutant is *Arthrobacter citreus* ATCC 21422.

7. A method as set forth in claim 1, wherein said mutant is *Bacillus subtilis* FERM-P 464.

8. A method as set forth in claim 1, wherein said mutant is *Candida lipolitica* FERM-P 424.

9. A method as set forth in claim 1, wherein said mutant is prepared prior to said culturing by exposing said parent strain to a mutagenic agent until mutants of said parent strain are formed, said parent strain prior to said exposing being unable to produce L-phenylalanine when cultured on said medium, and selecting from the exposed parent strain a mutant tolerant to said analogue of L-phenylalanine and capable of producing L-phenylalanine in said culture medium.

10. A method as set forth in claim 1, wherein said parent strain is a strain of *Brevibacterium lactofermentum*, *Brevibacterium flavum*, *Corynebacterium acetoacidophilum*, *Arthrobacter citreus*, *Bacillus subtilis*, or *Candida lipolytica*.

11. A method as set forth in claim 10, wherein said analogue of L-phenylalanine is $\beta$-amino-$\beta$-phenylpropionic acid, o-fluorophenylalanine, m-fluorophenylalanine, p-fluorophenylalanine, $\beta$-2-thienylalanine, $\beta$-3-thienylalanine, $\beta$-2-furylalanine, $\beta$-3-furylalanine o-aminophenylalanine, m-aminophenylalanine, p-aminophenylalanine, $\alpha$-amino-$\beta$-phenylethane sulfonate, $\beta$-2-pyrrolalanine, 1-cyclopentene-1-alanine, 1-cylohexene-1-alanine, $\beta$-4-pyridinylalanine, $\beta$-4-pyrazolealanine, p-nitrophenylalanine, $\beta$-4-thiazolealanine, cyclohexylalanine, 2-amino-4-methyl-4-hexenoic acid, S-(1,2-dichlorovinyl)-cysteine, o-chlorophenylalanine, m-chlorophenylalanine, p-chlorophenylalanine, o-bromophenylalanine, m-bromophenylalanine, or p-bromophenylalanine.

* * * * *